US009576254B2

(12) United States Patent
McGuire et al.

(10) Patent No.: US 9,576,254 B2
(45) Date of Patent: Feb. 21, 2017

(54) MULTI-TIERED FLEET MANAGEMENT CACHE

(75) Inventors: Gregory J. McGuire, Austin, TX (US); Jonathan E. Wolfe, Cambridge, MA (US)

(73) Assignee: Zipcar, Inc., Boston, MA (US)

( * ) Notice: Subject to any disclaimer, the term of this patent is extended or adjusted under 35 U.S.C. 154(b) by 92 days.

(21) Appl. No.: 12/028,477

(22) Filed: Feb. 8, 2008

(65) Prior Publication Data

US 2008/0228533 A1 Sep. 18, 2008

Related U.S. Application Data

(60) Provisional application No. 60/904,311, filed on Mar. 1, 2007.

(51) Int. Cl.
| *G06Q 10/02* | (2012.01) |
| *G06Q 50/28* | (2012.01) |
| *G06F 9/45* | (2006.01) |
| *G06F 12/08* | (2016.01) |
| *G08G 1/00* | (2006.01) |

(52) U.S. Cl.
CPC .............. *G06Q 10/02* (2013.01); *G06Q 50/28* (2013.01); *G06F 8/454* (2013.01); *G06F 12/0811* (2013.01); *G08G 1/20* (2013.01)

(58) Field of Classification Search
CPC ...... G06Q 10/02; G06Q 10/025; G06Q 50/30; H04W 64/00; G08G 1/20; G06F 8/454; G06F 12/0811
USPC .. 705/5–9; 701/207, 208, 213; 340/988–996
See application file for complete search history.

(56) References Cited

U.S. PATENT DOCUMENTS

| 5,359,724 | A | | 10/1994 | Earle | |
| 5,848,403 | A | * | 12/1998 | Gabriner et al. | ............... 706/13 |
| 5,922,040 | A | * | 7/1999 | Prabhakaran | ................. 701/117 |
| 6,850,153 | B1 | * | 2/2005 | Murakami et al. | ............... 705/5 |
| 2001/0037398 | A1 | * | 11/2001 | Chao et al. | ................... 709/230 |
| 2002/0049536 | A1 | | 4/2002 | Gaal | |

(Continued)

OTHER PUBLICATIONS

Myers, A Fast Bit-Vector Algorithm for Approximate String Matching Based on Dynamic Programming, Journal of the ACM, vol. 46, No. 3, May 1999, pp. 395-415.*

(Continued)

*Primary Examiner* — Daniel Vetter
(74) *Attorney, Agent, or Firm* — Wayne Edward Ramage; Baker Donelson

(57) ABSTRACT

A method of providing reservation status relating to a group of objects includes providing a database for containing (i) availability data describing availability of at least one of the group of objects, and (ii) reservation data describing allocation of at least one of the group of objects. The availability data and the reservation data are stored in sparse form. The method further includes extracting, from the database, availability data and reservation data corresponding to a predetermined period of time, and combining the extracted availability data and reservation data to form windowed data in a dense format. The method also includes receiving the windowed data and providing the windowed data in a bit-vector view, and sampling the windowed data in the bit-vector view to produce sampled data. The sampled data provides the reservation status as a static view of the windowed data in the bit-vector view.

17 Claims, 2 Drawing Sheets

(56) References Cited

U.S. PATENT DOCUMENTS

| | | | |
|---|---|---|---|
| 2002/0165848 A1* | 11/2002 | Rautenbach et al. | G06F 8/4442 |
| 2002/0186144 A1* | 12/2002 | Meunier | 340/825.28 |
| 2003/0018502 A1* | 1/2003 | Rodriguez | 705/7 |
| 2003/0217074 A1 | 11/2003 | Wallace | |
| 2004/0073468 A1* | 4/2004 | Vyas et al. | 705/8 |
| 2004/0243593 A1 | 12/2004 | Stolte et al. | |
| 2005/0065910 A1* | 3/2005 | Welton et al. | 707/2 |
| 2005/0108191 A1* | 5/2005 | Iyengar et al. | 707/1 |
| 2005/0125310 A1* | 6/2005 | Hazi et al. | 705/27 |
| 2006/0074702 A1* | 4/2006 | Schuette et al. | 705/1 |
| 2006/0095434 A1* | 5/2006 | McCullough et al. | 707/10 |
| 2006/0190280 A1* | 8/2006 | Hoebel et al. | 705/1 |
| 2006/0288173 A1 | 12/2006 | Shen | |
| 2007/0143155 A1* | 6/2007 | Whitsett et al. | 705/5 |
| 2007/0245090 A1* | 10/2007 | King et al. | G06F 12/0813 711/129 |

OTHER PUBLICATIONS

Import Matrix from Sparse Matrix External Format, MATLAB, http://www.mathworks.com/help/techdoc/ref/spconvert.html, 2 pages, Jun. 28, 2011.

Duff, Ian, Sparse matrix Test Problems, ACM Transactions on Mathematical Software, vol. 15, No. 1, Mar. 1989, pp. 1-14.

Gockenbach, Mark S., Creating a Sparse Matrix, http://www.math.mtu.edu/~msgocken/intro/node18.html, EDT 1999, 4 pages, Jun. 28, 2011.

Converting Standard MPS Format to Sparse Format, http://support.sas.com/documentation/cdl/en/ormpug/59679/HTML/default/lp_sect31.htm, 4 pages, Jun. 28, 2011.

Sparse Arrays, http://idlastro.gsfc.nasa.gov/idl_html_help/Sparse_Arrays.html/, IDL Online Help (Mar. 6, 2007) 4 pages, Jun. 28, 2011.

International Search Report Corresponding to International Publication No. PCT/US08/53443, mailed May 23, 2008.

* cited by examiner

MULTI-TIERED FLEET MANAGEMENT CACHE

CROSS REFERENCE TO RELATED APPLICATIONS

This application claims benefit of the following Patent Applications: U.S. Provisional Patent Application Ser. No. 60/904,311, filed Mar. 1, 2007.

BACKGROUND OF THE INVENTION

The present invention relates to fleet management systems, and more particularly, to techniques for quickly and efficiently accessing and analyzing database information related to managing a fleet of reservable assets.

A fleet asset management system, such as a vehicle reservation system, typically stores information related to the assets themselves, along with the demands on those assets, within a database. Such information may include asset availability as a function of time, periods of time for which particular assets are to be used (i.e., reserved), and periods of time for which particular assets are free.

A significant number of fleet assets and a significant number of demands on each of those assets can add up to a large amount of information in the database. In order to keep the size of the database relatively small, the information can be stored in the database in a "sparse" format, i.e., in a format that records only the temporal boundaries where data changes.

However, when the information is stored in a sparse format, the information is not particularly easy to understand and interpret. Evaluations of this sparse data can get expensive in terms of processing power required to access the database and process the accessed information.

SUMMARY OF THE INVENTION

In one aspect, the invention is an apparatus for providing reservation status relating to a group of objects. The apparatus includes a database constructed and arranged to contain (i) availability data describing operational status of at least one of the group of objects, and (ii) reservation data describing allocation of at least one of the group of objects. The availability data and the reservation data are stored in sparse form. The apparatus further includes a windowing module for extracting, from the database, availability data and reservation data corresponding to a predetermined period of time, and combining the extracted availability data and reservation data to form windowed data in a dense format. The apparatus also includes a bit-vector module for receiving the windowed data and for providing the windowed data in a bit-vector view, and a copying module for sampling the windowed data in the bit-vector view to produce sampled data. The sampled data provides the reservation status as a static view of the windowed data in the bit-vector view.

In one embodiment, the group of objects includes a fleet of automobiles. In another embodiment, the fleet of automobiles is geographically distributed over a predetermined area.

In another embodiment, the availability data includes binary information specifying, for each of the at least one of the group of objects, that either (i) the object is functionally capable of performing a task, or (ii) the object is not functionally capable of performing the task. Another embodiment further includes a receiver module for receiving current availability data from at least one of the group of objects, and for updating the database with the current availability data.

In one embodiment, the sampled data is provided to at least one of (i) a telephone interface, (ii) a network interface, or (iii) a customer service interface. Another embodiment further an application server for receiving a copy of the sampled data. The state between the copy of the sampled data and the data contained in the database is maintained at or near real time.

In another embodiment, the copying module provides a copy of the sampled data to each of two or more application servers running application server software. In one embodiment, the application server software maintains consistency between the copies of the sampled data on the two or more application servers using a distributed invalidation function to inform the two or more application servers of impending changes to the copies of the sampled data. In another embodiment, the application server software maintains consistency between the copies of the sampled data on the two or more application servers by polling a journal table that records changes to the windowed data, and using the recorded changes to update the copy of the sampled data.

Another aspect includes a method of providing reservation status relating to a group of objects. The method includes providing a database for containing (i) availability data describing availability of at least one of the group of objects, and (ii) reservation data describing allocation of at least one of the group of objects. The availability data and the reservation data are stored in sparse form. The method further includes extracting, from the database, availability data and reservation data corresponding to a predetermined period of time, and combining the extracted availability data and reservation data to form windowed data in a dense format. The method further includes receiving the windowed data and providing the windowed data in a bit-vector view, and sampling the windowed data in the bit-vector view to produce sampled data. The sampled data provides the reservation status as a static view of the windowed data in the bit-vector view.

In one embodiment, the method further includes receiving current availability data from at least one of the group of objects, and updating the database with the current availability data. In another embodiment, the method further includes providing the sampled data to at least one of (i) a telephone interface, (ii) a network interface, or (iii) a customer service interface.

One embodiment further includes an application server for receiving the sampled data, wherein the copying module maintains the state between the sampled data and the application server at or near real time. Another embodiment further includes providing a copy of the sampled data to each of two or more application servers running application server software. Yet another embodiment further includes maintaining consistency between the copies of the sampled data on the two or more application servers using a distributed invalidation function to inform the two or more application servers of impending changes to the copies of the sampled data.

One embodiment further includes maintaining consistency between the copies of the sampled data on the two or more application servers by polling a journal table that records changes to the windowed data, and using the recorded changes to update the copy of the sampled data.

Another aspect includes an apparatus for providing reservation status relating to a fleet of automobiles. The apparatus includes a database for containing (i) availability data describing operational status of at least one of the fleet of automobiles, and (ii) reservation data describing allocation of at least one of the fleet of automobiles. The availability data and the reservation data are stored in sparse form. The apparatus also includes a receiver module for receiving current availability data from at least one of the fleet of automobiles, and for updating the database with the current availability data. The apparatus also includes a windowing module for extracting, from the database, availability data and reservation data corresponding to a predetermined period of time, and combining the extracted availability data and reservation data to form windowed data in a dense format. The apparatus further includes a bit-vector module for receiving the windowed data and for providing the windowed data in a bit-vector view, and a copying module for sampling the windowed data in the bit-vector view to produce sampled data, wherein the sampled data provides the reservation status as a static view of the windowed data in the bit-vector view.

Another aspect includes a system for providing reservation status relating to a fleet of automobiles. The system includes one or more automobiles, each having diagnostic equipment for providing availability data describing operational status associated with the automobile, and communication equipment for transmitting the availability data. The system also includes a reservation database platform, including database software. The database software is operative to provide a database constructed and arranged to contain the availability data of at least one of the fleet of automobiles, and reservation data describing allocation of at least one of the fleet of automobiles, wherein the availability data and the reservation data are stored in sparse form. The database software is also operative to provide a windowing module for extracting, from the database, availability data and reservation data corresponding to a predetermined period of time, and combining the extracted availability data and reservation data to form windowed data in a dense format. The database software is also operative to provide a bit-vector module for receiving the windowed data and for providing the windowed data in a bit-vector view. The database software is further operative to provide a copying module for sampling the windowed data in the bit-vector view to produce sampled data, wherein the sampled data provides the reservation status as a static view of the windowed data in the bit-vector view. The reservation database platform includes a receiver module for receiving current availability data from at least one of the fleet of automobiles, and for updating the database with the current availability data. The system further includes at least one application server for receiving a copy of the sampled data.

In one embodiment, application server software running on the at least one application server monitors the reservation database platform for a change in the sampled data, and updates the copy of the sampled data when the change in the sampled data is detected.

In another embodiment, the application database software maintains consistency between (i) the availability data and reservation data in the database, and (ii) the sampled data, by propagating changes in the availability data and the reservation data through the windowing module, the bit-vector module and the copying module.

BRIEF DESCRIPTION OF DRAWINGS

The foregoing and other objects of this invention, the various features thereof, as well as the invention itself, may be more fully understood from the following description, when read together with the accompanying drawings in which.

DESCRIPTION OF THE PREFERRED EMBODIMENTS

The embodiments described herein include an apparatus, method and/or system that uses a multi-tiered cache coupled to a database to provide a user with filtered reservation results with respect to a group of objects geographically disbursed across a predetermined area. The predetermined area may include, for example, a office or college campus, a community, a city or a region.

The described embodiments provide for allocation of scarce fleet resources to a large pool of users. One embodiment is directed to making reservations in a automobile-sharing service, but alternative embodiments can be used for other asset management applications, such as reservations for other shared resource applications, including fleet management, ride-sharing, living accommodations (e.g., hotel/motel, vacation properties), tool rentals, library books, video games and movies, sports and outdoor equipment (e.g., bicycles, canoes, camping gear), among others.

In several of the embodiments described herein, the objects to be reserved are vehicles, for example automobiles, distributed throughout a city. These vehicles are available for use by pre-authorized people (i.e., users) that require temporary transportation. However, these embodiments are exemplary only, and other embodiments may be directed to other types of objects that can be geographically distributed, and reserved for temporary use by a group of users. Other applications of the concepts described herein may include but are not limited to corporate fleet management, ride sharing as applied to a fleet of vehicles, and commercial fleet management.

Primary information about the objects (the vehicles in this embodiment) is stored in a database, along with information about users' reservations on those objects. Primary data about the objects may include, but is not limited to, (i) vehicle type, (ii) current usability (i.e., whether the vehicle is functioning properly capable of being used), (iii) reported problems associated with the vehicle, (iv) location of the vehicle, among others. This data is stored in a sparse format in the database as described herein.

Figure 1:
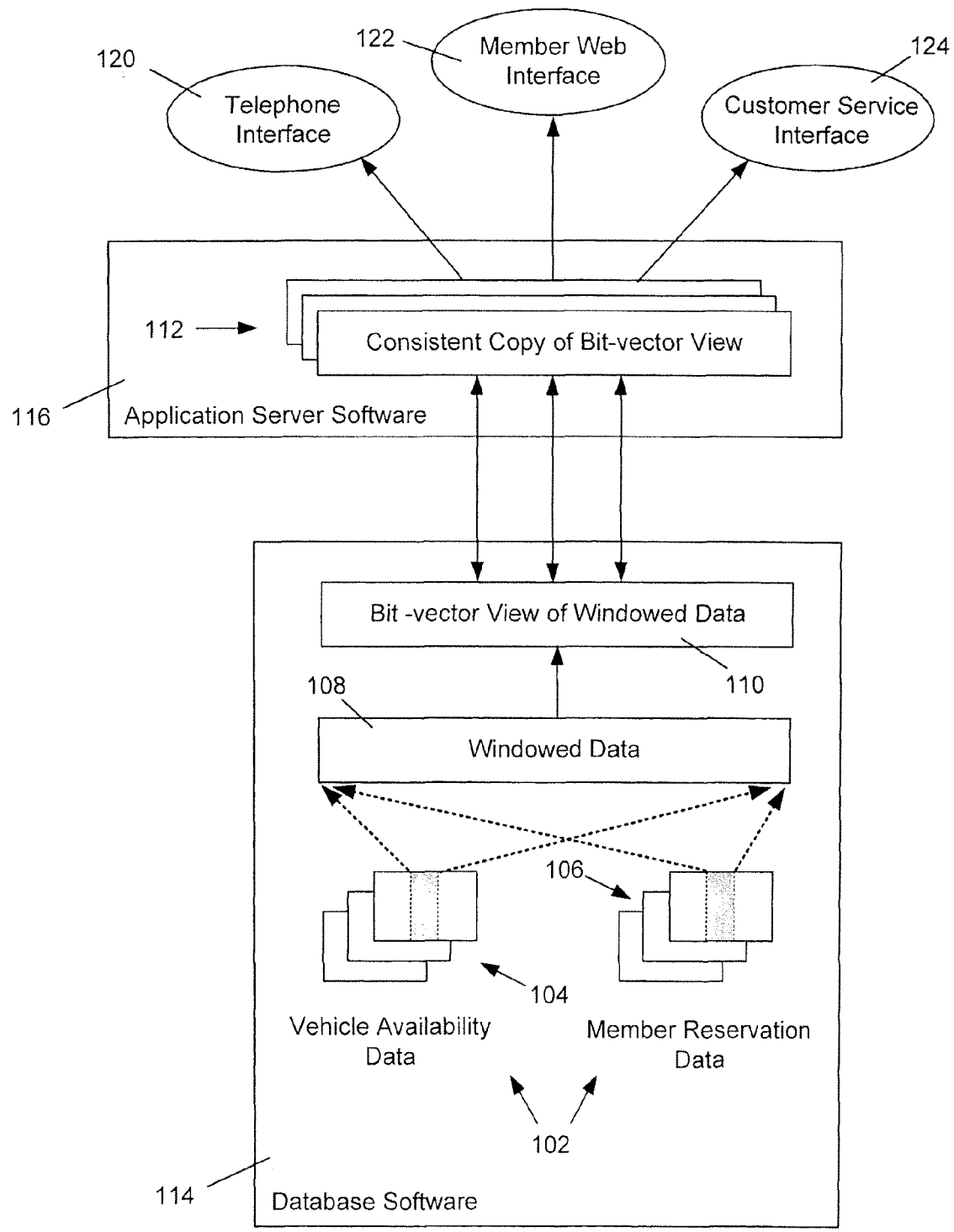
FIG. 1 shows a sectional view of one embodiment of a fleet management cache system using multiple tiers.

FIG. 1 shows a sectional view of one embodiment of a fleet management cache system using multiple tiers. In general, this embodiment includes three caching levels above the database 102, although other embodiments may include more or fewer tiers. The database 102 includes two components: (1) vehicle availability data 104 and (2) member reservation data 106.

The vehicle availability data 104 include information regarding the operational status of each of the vehicles, i.e., whether it is capable of being used. The availability data 104 may include, but is not limited to, information such as whether the vehicle passes certain diagnostic tests regarding its functionality (i.e., the engine is operational, the tires are inflated, the battery is charged, etc.), whether the vehicle is sufficiently fueled, and whether a previous driver has reported safety problems. In some embodiments, the availability data 104 for a particular vehicle is represented by a binary value such as PASS or FAIL, i.e., the vehicle is functionally capable of performing a task (being driven), or the object is not functionally capable of performing the task.

The member reservation data 106 includes information regarding whether the vehicle has already been allocated to another user for a particular time period.

The first caching level is windowed data 108 that converts the sparse data stored in the database 102 to a dense view that is windowed in time. The windowed data 108 is updated, in real time or near real time, whenever the underlying data in the database 102 changes. The windowed data 108 represents the availability of an object to be reserved. In transforming the sparse format information stored in the database to the dense format of the windowed data 108, the described embodiment combines or merges individual records in the database 102 into a complete set of data that is substantially easier to interpret and manipulate.

The windowed data 108 is thus a combination of a time-based window of dense data representing the vehicle availability data 104 described above, and a dense data view of member reservations from the current time going forward. The format of these two components is similar or the same, so that the two views can be easily combined to form the overall windowed data 108 described above.

In general, the size of the window is such that the window will include a significant number of the total existing reservations. The window moves as with respect to the current time, and the size of the window may increase or decrease depending upon the number of existing reservations. In a typical system, the window will account for tens of thousands of reservable objects and hundreds of thousands of members that can reserve the objects, although other window sizes may be used in the described embodiments.

The second caching level is a bit-vector view 110 of the windowed data 108. The bit-vector view 110 allows the windowed data 108 to be stored in a very compact manner, i.e., in bit vectors, thereby efficiently utilizing storage and computing assets for faster data access. The bit vector data implements a simple set data structure that is effective at exploiting bit-level parallelism in hardware to enable operations to be performed quickly.

The third caching level is a copy 112 of the bit-vector view 110. The database 102, the windowed data 108 and the bit-vector data 110 are all components of the database software 114.

Application server software 116 resides on an application server, which together provide an interface to external to the described system. The bit-vector copy 112 is a component of the application server software 116 that is coupled to and communicates with the database software 114. This copy located on the application server allows a user to evaluate the reservation data without having to access the database. The copy can be instantiated on a number of different application servers, so that many users can evaluate the reservation data separately without having to compete for the database assets.

The third caching layer loads the bit vectors from the bit-vector view 110 into a computer's in-memory array (RAM), and maintains a consistent view of this bit-vector data whenever the underlying data in the database 102 changes. This third layer within the application server software 116 reduces the need to look at the data from the bit-vector view 110 when checking for object asset availability. These in-RAM caches can exist on any number of computers independent of the database.

To maintain consistency across the bit-vector cache copies, embodiments may employ one of the two techniques described below, or a combination of these techniques.

The first technique uses a distributed invalidation function at the application server level to inform other application servers (and thus the other bit-vector cache copies) of impending changes to the reservation and vehicle data. This technique utilizes the HTTP protocol with a special cache invalidation request format built on top. When one application server makes a reservation request or vehicle allocation change that would alter the bit-vector cache, it first invalidates its own bit-vector cache copy, and then instructs other application servers to do the same. The data is then re-cached by a dedicated application server process once instructed to do so by the database.

The second technique utilizes a database journal table to record changes to the windowed data (which is already updated in real time when changes to the underlying sparse data occur). The application server process responsible for generating the bit-vector cache copies then polls this table for changes, updates all cache copies across application servers, and continues.

The first technique prevents stale cache data from being used at the application server level; the second technique prevents stale cache data, as a result of direct database changes, from persisting. Due to the nature of the application, a small time window when stale data persists is acceptable; however by utilizing a combination of these two techniques that window is significantly reduced or completely eliminated.

Cache state between the application server and the database is maintained at or near real time. The database software 114 forces changes in the database 102 up the cache stack, and the application server software 116 polls for changes down the cache stack. Together, these actions create a very small window for which the cache layers between the database and the application server will be different.

The copy 112 of the bit-vector view may be accessed by one or more of a number of different interfaces to the application server software 116, as shown in FIG. 1. In one embodiment a user may access the copy 112 through a telephone interface 120, through for example an interactive voice response (IVR) system. In another embodiment a user may access the copy 112 through a member network interface 122, such as a web browser communicating through the Internet. In yet another embodiment, the copy 112 of the bit-vector view may be accessed via internal administrative tools through the customer service interface 124. Such administrative tools may be used, for example, by an agent of the fleet service processing a reservation on behalf of a customer.

In some embodiments, the database 102 receives primary information regarding the objects to be reserved directly from the objects themselves. In these embodiments, the objects, for example vehicles, include diagnostic and communication equipment for gathering and transmitting information to the fleet management caches system through any of several media types known in the art. For example, the vehicles may transmit the object information via cellular data networks to Internet access points, then through the Internet to the database 102. The system in which the database 102 resides includes a receiver for receiving the object information, formatting the information into a form suitable for the database 102, and entering the information into the database 102.

Figure 2:
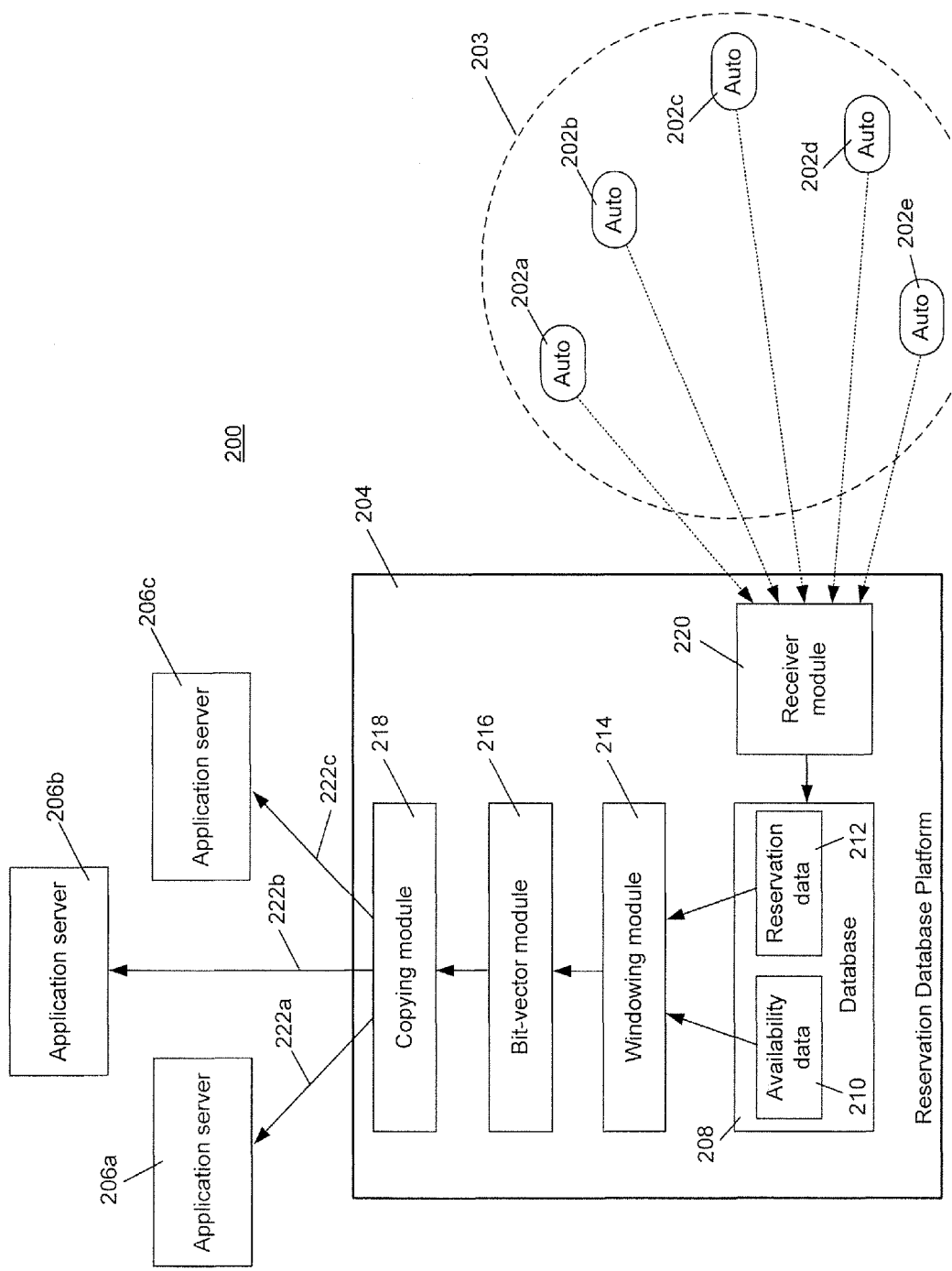
FIG. 2 illustrates an example of a reservation system, constructed and arranged according the described embodiments.

FIG. 2 illustrates an example of a reservation system 200, constructed and arranged according the described embodiments. The system 200 includes a fleet of automobiles 202*a*, 202*b*, 202*c*, 202*d* and 202*e* geographically distributed over an area 203, a reservation database platform 204, and application servers 206*a*, 206*b* and 206*c*. Other embodiments may included different numbers of automobiles 202 and application servers 206.

The reservation database platform 204 may include any processing system capable of executing the database software as described herein. The database platform 204 thus may include a server, a stand-alone computer, a workstation, or other such computing devices known in the art.

The reservation database platform 204 includes a database 208 containing availability data 210 and reservation data 212, a windowing module 214, a bit-vector module 216, a copying module 218 and a receiver module 220. The database platform also includes other components typical to such platforms, such as memory devices (e.g., hard drives, FLASH memory, etc.) for storing the database software program code and other program code (e.g., operating system), power supplies, interface devices, displays, among other components.

Each of the application servers 206 receives a static copy of the sampled windowed data in bit-vector view from the copying module 218. In this embodiment, the communication links 222*a*, 222*b* and 222*c* between the reservation database platform 204 and the respective application servers 206 is an Internet connection, although other embodiments may utilize other communication techniques known in the art such as a wireless (e.g., cellular telephone network) link, a dedicated, hard-wired link (e.g., communications utilizing coaxial cable or fiber optics) or a public switched telephone network.

Each of the automobiles 202 includes equipment necessary to ascertain the functionality and/or usability of the automobile, and to transmit this information to the receive module 220 of the reservation database platform 204. The communication links 224*a*, 224*b*, 224*c*, 224*d* and 224*e* between the automobiles 202 and the receiver module 220 are shown as directed dotted lines in FIG. 2, although it is understood that these links (as described herein) may include various relay links (e.g., through one or more access points and network hops), and may not be direct links to the receiver module 220. Further, although the links 224 are shown as unidirectional, in some embodiments the links 224 are bidirectional, allowing the reservation database platform to return information to the automobiles 202.

The invention may be embodied in other specific forms without departing from the spirit or essential characteristics thereof. The present embodiments are therefore to be considered in respects as illustrative and not restrictive, the scope of the invention being indicated by the appended claims rather than by the foregoing description, and all changes which come within the meaning and range of the equivalency of the claims are therefore intended to be embraced therein.

What is claimed is:

1. A system for providing reservation status relating to a plurality of objects, comprising:

a database, implemented on a first computing system, the database constructed and arranged to contain (i) operational status data describing whether each particular object of said plurality of objects is functionally capable of performing a task, and (ii) reservation data describing availability of each particular object of the plurality of objects for a reservation by a pre-authorized user, wherein the reservation data comprises information regarding whether each particular object of the plurality of objects is allocated to another pre-authorized user for a particular time period;

a first caching level module, implemented on the first computing system, configured to create a first cache of dense windowed data by (i) receiving, from the database, operational status data and reservation data from a window of time, and (ii) converting the received operational status data and reservation data to form windowed data denser than the received operation status data and reservation data;

a second caching level module, implemented on the first computing system, configured to create a second cache of compact data by storing the dense windowed data in the first cache in a simple set data structure; and a third caching level module, implemented on the first computing system, configured to create one or more third caches by copying the second cache, wherein said one or more third caches are provided to one or more application computing systems separate from the first computing system, such that a copy of cached windowed data is stored on the second computer system for access by an end user computing device without access to the first computer system;

wherein the first cache is updated whenever the data in the database changes;

further wherein the first computing system both (i) updates the one or more third caches on said one or more application computing systems following a change to the first cache, and (ii) receives, from the one or more application computing systems, polls for changes in the database that affect the corresponding third caches, thereby minimizing the time the third caches, second cache and the first cache are different.

2. The system of claim 1, wherein the plurality of objects is a fleet of automobiles.

3. The system of claim 1, wherein the operational status data comprises binary information specifying, for each of the at least one of the plurality of objects, that either (i) the object is functionally capable of performing a task, or (ii) the object is not functionally capable of performing the task.

4. The system of claim 1, comprising a receiver module configured for receiving current operational status data from at least one of the plurality of objects, and for updating the database with the current operational status data.

5. The system of claim 1, wherein the state between the third caches, the second cache, the first cache, and the data contained in the database is maintained at or near real time.

6. The system of claim 1, wherein the third caching level module provides a third cache to each of one or more application servers running application server software.

7. The system of claim 6, wherein the application server software maintains consistency between the third caches on each of the one or more application servers and the second cache by using a distributed invalidation function to inform the one or more application servers and the first computing system of impending changes to a third cache.

8. The system of claim 6, wherein the application server software maintains consistency between the third caches on the one or more application servers by polling a journal table that records changes to the first cache, and using the recorded changes to update the second cache and third caches.

9. The apparatus of claim 1, wherein the data is the second cache is stored as bit-vector data configured to exploit bit-level parallelism.

10. A computer implemented method of providing reservation status relating to a plurality of objects, comprising:

extracting, by a first computer system, from a database, availability data and reservation data corresponding to a predetermined period of time, wherein the database contains (i) operational status data describing whether each particular object of said plurality of objections is functionally capable of performing a task, and (ii) reservation data describing availability of each particular object of the plurality of objects for a reservation by a pre-authorized user, wherein the reservation data comprises information regarding whether each particular object of the plurality of objects is allocated to another pre-authorized user for a particular time period;

combining, by the first computer system, the extracted operational status data and reservation data to create a first cache of dense windowed data denser than the extracted operational status data and reservation data;

creating a second cache of compact by storing the dense windowed data in the first cache in a simple set data structure;

creating a third cache by copying the second cache to a second computer system, such that the third cache is stored on the second computer system for access by an end user computing device without access to the first computer system; and updating, by the first computer system, the first cache whenever the data in the database changes;

wherein the first computer system both (i) updates the third cache following a change to the first cache, and (ii) receives, from the second computer system, polls for changes in the database that affects the third cache, thereby minimizing the time the third cache, second cache, and first cache are different.

11. The method of claim 10, comprising receiving current operational status data from at least one of the plurality of objects, and updating the database with the current operational status data.

12. The method of claim 10, wherein the second computer system comprises an application server, wherein conformity between the first cache and third cache on the application server are maintained at or near real time.

13. The method of claim 10, wherein there are two or more second computer systems each comprising an application server.

14. The method of claim 13, comprising the step of maintaining consistency between the third caches on the two or more application servers using a distributed invalidation function to inform the two or more application servers of impending changes to the third caches.

15. The method of claim 13, comprising the step of maintaining consistency between the third caches on the two or more application servers by polling a journal table that records changes to the first cache, and using the recorded changes to update the second cache and third caches.

16. The method of claim 10, wherein the data is the second cache is stored as bit-vector data configured to exploit bit-level parallelism.

17. The method of claim 10, wherein the plurality of objects is a fleet of automobiles.

* * * * *